United States Patent [19]
Piccolo

[11] Patent Number: 6,073,389
[45] Date of Patent: Jun. 13, 2000

[54] STUMP DABBER

[75] Inventor: Michael Piccolo, Sault Ste. Marie, Canada

[73] Assignee: The Stump Dabber Corporation, Sault Ste. Marrie, Canada

[21] Appl. No.: 09/136,314

[22] Filed: Aug. 19, 1998

[51] Int. Cl.⁷ .................................................. A01G 13/10
[52] U.S. Cl. .................................................................. 47/1.5
[58] Field of Search ............................... 47/1.5; 111/106, 111/108; 172/21, 318; 37/322; 239/571; 401/185

[56] References Cited

U.S. PATENT DOCUMENTS

| | | | |
|---|---|---|---|
| 4,305,224 | 12/1981 | Maddock | 47/1.5 |
| 4,349,988 | 9/1982 | Kotula et al. | 47/1.5 |
| 4,357,779 | 11/1982 | Maddock | 47/1.5 |
| 4,409,755 | 10/1983 | Maddock | 47/1.5 |
| 4,727,678 | 3/1988 | Struve et al. | 47/1.5 |
| 4,825,897 | 5/1989 | Shade | 239/571 X |
| 5,499,474 | 3/1996 | Knoihuizen | 47/1.5 |
| 5,544,443 | 8/1996 | Steglich | 47/1.5 |
| 5,555,673 | 9/1996 | Smith | 47/1.5 |
| 5,724,765 | 3/1998 | Wegner | 47/1.5 |
| 5,813,122 | 9/1998 | Mubareka | 47/1.5 X |

FOREIGN PATENT DOCUMENTS

| | | | |
|---|---|---|---|
| 550505 | 12/1957 | Canada | 47/1.5 |
| 0 058 612 | 8/1982 | France | 47/1.5 |
| 2 122 885 | 1/1984 | United Kingdom | 47/1.5 |

OTHER PUBLICATIONS

Miller, Vernon. A Touch With a Wand Kills Weeds, Progressive Farmer, 44D, May 1981.

letter on the letterhead of Monsanto Canada Inc. dated May 13, 1998.

photocopy of advertising brochure entitled "Brush–Cutter/Stump–Treater".

advertisement for product identified under what is presumably a trade mark, SWIPER.

brochure for product sold under the trade mark SIDESWIPE which bears the date Dec. 5, 1998 and the time 10:33 p.m.

*Primary Examiner*—Michael J. Carone
*Assistant Examiner*—Jeffrey L. Gelluer
*Attorney, Agent, or Firm*—Bereskin & Parr

[57] ABSTRACT

For treating freshly cut tree stumps to inhibit regeneration of the stump, the stump is coated with herbicide. The herbicide is applied to the stump by means of a sponge or other application device. The sponge is housed in a housing which is connected to a reservoir with a long handle. After a tree is cut, herbicide is applied to the fresh cut surface. The treatment device may be attached to a saw and include a reservoir carried by the saw operator. The herbicide application device is clamped to the shaft of the rotary saw and positioned adjacent the safety guide so that immediately after the tree is cut, herbicide may be applied to the fresh cut.

8 Claims, 3 Drawing Sheets

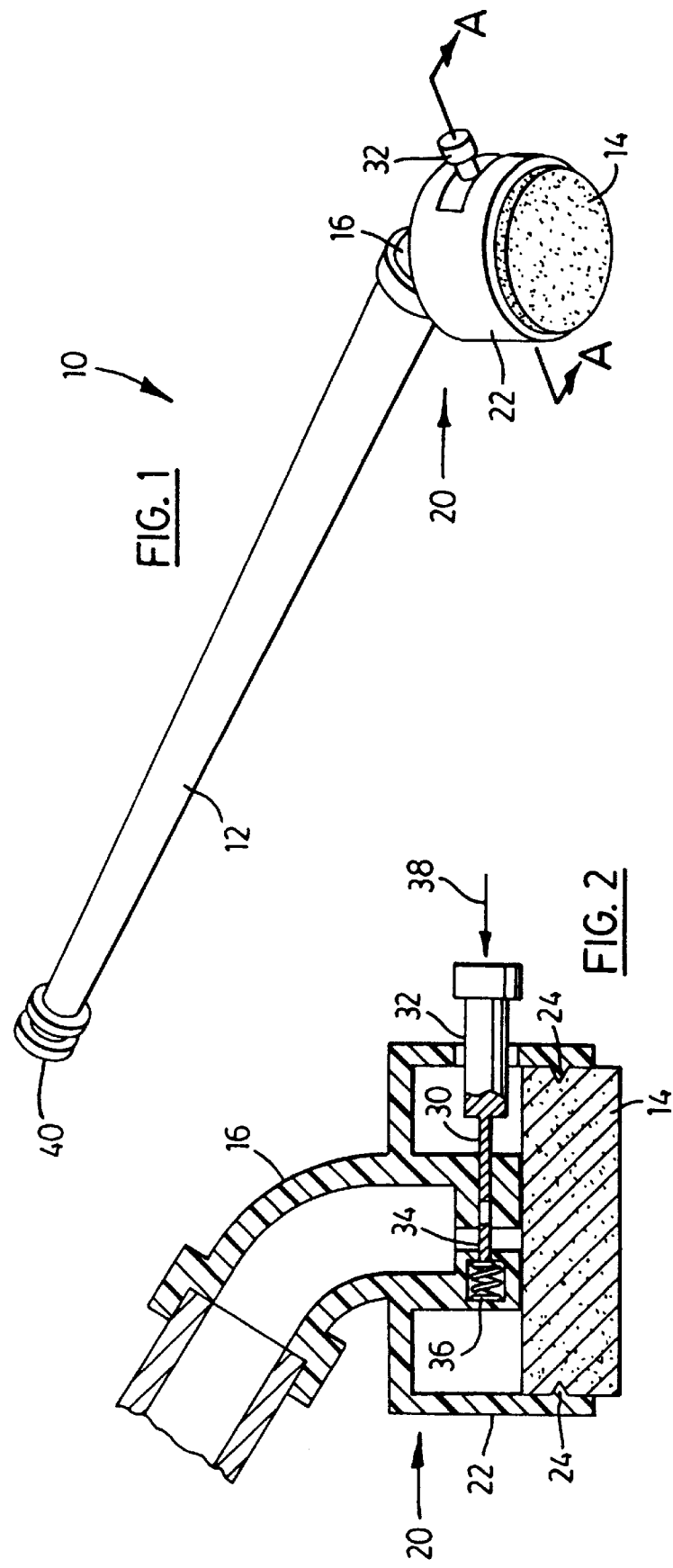

STUMP DABBER

FIELD OF THE INVENTION

This invention relates to cutting trees and treating cut stumps with herbicide to inhibit regrowth of the plant from the stump.

BACKGROUND OF THE INVENTION

Cutting of trees can be done for many reasons. In some aspects the tree cut can be large enough to be a useful source for lumber or other commercial uses. In many other cases, trees of much smaller diameter are cut simply as a matter clearing of land, brush and the like. One of the common ways of cutting relatively smaller trees is to use a manually carried power saw, known as a clearing saw. The clearing saw typically has a gasoline engine so that it may be used in remote areas where electric power would not be available. The engine is mounted at one end of a relatively long handle. A drive shaft couples the engine to a rotary saw blade located at the other end of the handle. A yoke-like mechanism may be used to position and carry the clearing saw. Such a rotary saw blade may have a diameter of in the order of 12 inches. Such a device can be used for cutting trees to approximately six inches in diameter.

Another device used for cutting trees of large diameter involves the standard chain saw. The chain saw has a gasoline powered motor which drives a chain. The chain is guided around its cutting length by some type of bar. The teeth to cut the wood are affixed to the chain and move along the cutting bar with the chain. Depending upon the length of the support bar and chain, chain saws can cut trees of very substantial diameter.

Whatever the method of cutting the tree, once the tree has been cut, it is usually desirable to ensure that the plant does not regenerate growth through the stump. In many locations it is far better to reforest with particular species of trees rather than encourage the stump to grow again. A healthy tree cut from a stump with an established root system will typically regenerate itself. However, the regenerated tree may not be desirable in terms of size, species or other characteristics such as the number of branches which may result from the cut stump. Thus, in many cases, it is desirable to ensure that the stump is killed so that the plant will not attempt to regenerate itself from the cut stump. Typically, this has been done by applying a suitable herbicide to the freshly cut stump. It is particularly effective to apply herbicide shortly after the tree is cut before the sap flowing in the stump seals off the open pores in the sap wood.

In many cases where land is being cleared and trees cut down, a first individual manipulates whatever type of tree felling instrument is being used to cut the trees. Then, steps are taken to apply herbicide to the stump. This may involve the person who felled the tree who may be obliged to put down the saw and then apply a herbicide. Alternatively, a second person will follow the tree feller or fellers and treat the newly created stumps. Heretofore, one of the most convenient ways of treating the felled stump has been to use a pressure sprayer. A pressure sprayer may involve a tank or reservoir with a flexible hose. The flexible hose or conduit may be attached to a wand-like device which can be carried in the hand. At the terminal end of the wand a spray head or nozzle is provided so that fluid may be delivered from the reservoir to the spray head. To facilitate this, the sprayer may be pressurized by means of a hand operated air pump. The person applying herbicide to the freshly cut stumps then walks through the areas of new stumps and sprays the herbicide on the fresh cut stump.

While this is effective in killing the stump, several problems have been noted. The spray pattern may not be as accurate as desired. Particularly on days when there is any wind present while the fresh cut stumps are being sprayed, there is a significant danger that the spray will be applied not only to the stump as desired, but also to adjacent vegetation. Because the herbicide is most effective when applied to the sapwood which is located around the periphery of the plant, the spray is routinely applied not only to the desired sapwood area, but also immediately adjacent the stump on the ground. This carries with it the possibility that the herbicide will be applied to desirable vegetation which may surround the freshly cut stump. Because the pressure in the reservoir may change as the liquid herbicide is applied to the stump, the spray pattern may also change and thus the accuracy with which the herbicide is applied may change depending upon the pressure in the spray apparatus.

Another approach has been taken to address the problem of applying the herbicide to a freshly cut stump. A device comprising a combination brush cutter and stump treater has been proposed. Such a device is available from Enso. The Enso device is intended for addition to clearing saws of the type referred to above having a rotating cutting blade in the order of approximately 12 inches in diameter. The stump treating apparatus includes a reservoir which is supported on the body of the operator. There is a conduit which passes along the length of the shaft of the clearing saw which terminates in a spray nozzle. A feed pump may be provided to facilitate movement of the herbicide from the tank to the nozzle. The spray nozzle is arranged adjacent to the cutting blade with the intent that a coating of herbicide is sprayed onto the cutting blade while the cutting blade is in operation. This device thus provides a one step process. As the blade spins to cut the wood it is coated with the herbicide thereby applying herbicide as the plant is cut.

One of the problems that remains with this device is that there is again a spray discharge of the herbicide. In addition, by spraying the herbicide on the blade which is rotating at relatively high speed, there is also the possibility that the liquid discharged onto the blade will be thrown centrifugally from the blade and thus applied to other plants in the locus of the tree being cut. Thus, this device is also subject to problems when there is wind present and may apply herbicide to plants other than the tree being cut.

Accordingly, there is a need for a simple effective way to apply herbicide to a freshly cut stump, while minimizing the chances of application of herbicide to plants other than the freshly cut stump.

SUMMARY OF THE INVENTION

In accordance with the present invention the stump treating device comprises a fluid reservoir and a fluid application device. A valve is provided for controlling flow of fluid from the reservoir to the fluid application device. The fluid application device receives liquid herbicide from a reservoir and applies the herbicide to a freshly cut stump by contact of the fluid application device with the stump.

In accordance with another embodiment of the invention, the invention provides in combination a tree cutting device of the type having a rotary saw blade, a motor to power the saw blade and a shaft extending between the motor and the saw blade. The combination includes a reservoir for liquid herbicide, a conduit and a fluid application device. The conduit is affixed to the shaft. The application device is separate from, but located adjacent to the saw blade so that a tree may be cut by the saw blade to produce a stump and fluid from said reservoir may be applied directly to said stump by contacting said stump with said fluid application device after said tree is cut.

In accordance with a further embodiment of the invention, the invention includes an assembly kit for use with a rotary powered tree saw, the assembly kit comprising a fluid application device, the fluid application device being mounted in a housing. The housing comprises a fluid inlet for delivery of fluid to the application device. The housing also includes support means for supporting the housing. The kit further includes a clamp for affixing said housing to the handle of a rotary saw cutting instrument. The support means further includes adjustment means for adjusting the location of the fluid application device relative to the clamp means so that said assembly kit may be attached to the shaft of a rotary saw cutting means and the fluid application device may be positioned adjacent the rotary saw blade.

DESCRIPTION OF THE DRAWINGS

For a better understanding of the present invention and to show more clearly how it may be carried into effect, reference will now be made by way of example to the accompanying drawings. The drawings show preferred embodiments of the present invention, in which:

FIG. 1 is a perspective view of a first embodiment in accordance with the invention;

FIG. 2 is a cross section through a portion of the device illustrated in FIG. 1;

DETAILED DESCRIPTION OF THE PREFERRED EMBODIMENT

Figure 3:
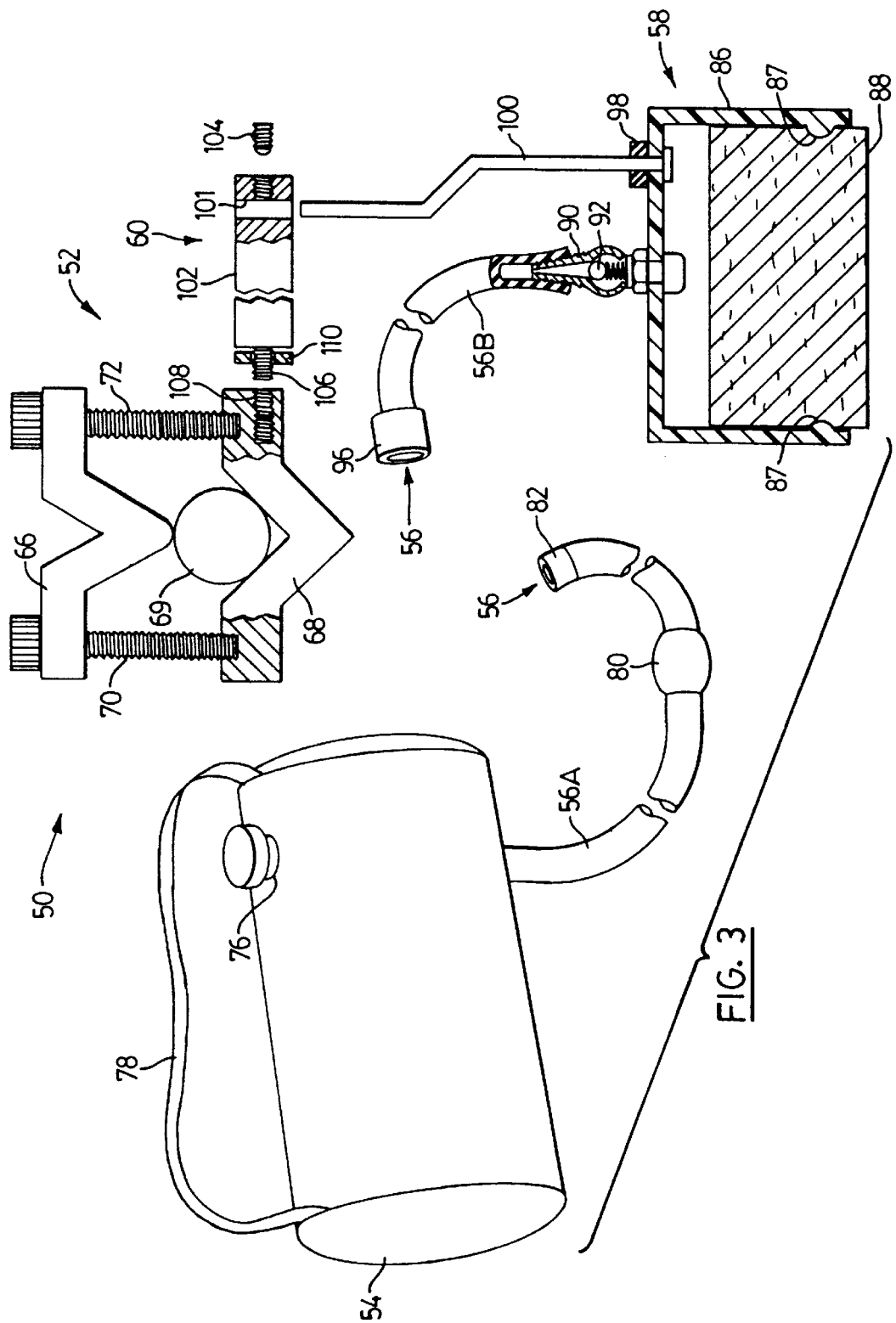
FIG. 3 illustrates an assembly kit in accordance with another aspect of the invention.

Referring now to FIG. 1, the device is illustrated generally at 10. The stump treating device comprises a reservoir 12 and a fluid application device 14.

In the embodiment illustrated in FIG. 1, the reservoir 12 is an elongated cylindrical handle which is hollow. Preferably the handle is of suitable length to enable the operator to hold the device with two hands and to apply the fluid application device 14 to a freshly cut stump without unnecessarily bending.

Fluid is delivered from the reservoir 12 to the fluid application device 14 by means of a conduit illustrated generally at 16.

The stump treating device 10 comprises a housing 20 which is attached to the reservoir 12. The housing 20 may be attached by means of a threaded fitting or other similar attachment means. The housing 20, as shown in FIG. 2, defines a cup 22. The cup 22 serves the function of locating the fluid application device 14. In the embodiment shown in FIGS. 1 and 2, the fluid application device 14 is in the form of a sponge. The sponge may be held in the cup 22 by means of inwardly extending projections or ribs 24. A plurality of ribs 24 may be distributed about the inner circumference of the cup 22 to maintain the sponge within the cup 22.

From reference to FIG. 2 it will be observed that there is a value 30. The valve 30 controls flow of fluid from the reservoir to the fluid application device 14. Advantageously the valve 30 includes a valve stem 32 which projects from the cup 22. The valve stem 32 is attached to a closure 34. The closure 34 is biassed to the flow blocking position by a spring 36. To open the closure 34, the valve stem 32 is pushed so that it travels longitudinally along its general longitudinal axis in the direction of arrow 38, thereby pressing the spring 36 and permitting fluid to flow through the conduit 16 to the fluid application device 14. When pressure against the valve stem 32 is removed, the spring 36 functions to move the closure 34 to the closed position.

In order to use the device shown in FIGS. 1 and 2, the reservoir is opened by removing the filling cap 40 from the reservoir 12. The reservoir 12 is then filled with suitable herbicidal fluid. This may be an aqueous solution mixed as appropriate for the particular herbicide. Fluid will then fill the reservoir 12 and will be held in the reservoir by the valve 30. When it is desired to apply herbicide to a freshly cut stump, the housing 20 is placed adjacent to a convenient surface. This may be the ground or the stump or other suitable surface such as a rock or the like. The suitable surface is then used as an anvil and the housing 20 pressed against the surface so that the surface contacts the valve stem 30 opening the valve closure 34. Fluid will then flow from the reservoir under the effect of gravity to saturate the sponge 14 to the desired level. The housing is then removed from the convenient surface to stop the flow of fluid to the sponge. With the sponge then in a suitably saturated condition, the sponge may be applied to the freshly cut surface of the stump thereby applying the fluid herbicide directly to the freshly cut stump.

FIG. 3 illustrates an alternate embodiment of the invention. The device illustrated generally at 50 in FIG. 3 has several component parts. The device includes a clamp 52, a reservoir 54, an conduit 56, an applicator housing 58 and an adjustable support means 60. The clamp 52 is comprised of a first clamp bracket 66 and a second clamp bracket 68. The two clamp brackets 66 and 68 each have a substantially right angular central portion adapted for containing therebetween, the shaft of a gasoline powered clearing saw. The shaft upon which the clamp is to be installed in shown as 69 in FIG. 3.

In order to adjust the clamp and affix it tightly to the shaft of the saw, screws 70 and 72 may be tightened to adjust the spacing between the clamp members 66 and 68 to accommodate differing sizes of shaft for rotary saws.

The reservoir 54 may be any convenient size or configuration. The reservoir may be filled through a fill opening 76. The reservoir may be carried by means of a strap 78. The strap 78 may be placed over the operator's shoulder to support the reservoir on the operator. Various other kinds of straps such as positioning the reservoir as a back pack, fanny pack or side pack may all be utilized. The conduit 56 is attached to the reservoir to deliver fluid from the reservoir. Preferably the conduit 56 comprises two portions 56A and 56B. To assist in delivery of fluid from the reservoir, the conduit 56A advantageously comprises a pump 80. Pump 80 may be hand operated and advantageously comprises a squeeze bulb with check valves. The conduit 56A advantageously terminates in a free end having a first quick connect, disconnect coupling 82. The conduit 56 may be of any convenient length.

The applicator housing 58 comprises a substantially cup shaped enclosure 86. Mounted within the cup shaped enclosure is a fluid application device 88. The fluid application device 88 is preferentially a sponge. Enclosure 86 includes locating means 87 for holding and positioning the sponge 88 within the enclosure 86. The applicator housing includes an inlet conduit 90. The inlet conduit 90 contains a check valve 92. The applicator housing also includes a shorter length of conduit 56B. The conduit 56B advantageously terminates in a free end having a second quick disconnect, connect coupling 96. The first and second couplings 82 and 96 are configured for interaction to create leak free fluid flow along conduit 56 from resevoir 54 to check valve 92.

The applicator housing includes a fitting 98 into which is fixed a rod 100. The rod 100 is received within a bore 101 contained in a support arm 102. A set screw 104 tightens against the rod 100 so that when the set screw 104 is adjusted the rod 100 cannot move either longitudinally or angularly with respect to the support arm 102.

The support arm 102 terminates in a threaded boss 106. Threaded boss 106 is received within a threaded bore 108 in the clamp bracket 68. The threaded boss 106 and bore 108 provides longitudinally adjustable spacing and angularly adjustable relationship of rod 100 relative to clamp 52. In order to lock the support arm 102 at the desired location and angle a lock nut 110 is threadably received on the threaded boss 106 for jamming against the clamp bracket 68.

In order to use the device shown in FIG. 3, the device is first attached to a clearing saw. The clearing saw typically involves a gasoline engine, an enclosed drive shaft and a rotary saw blade. The enclosed drive shaft is enclosed within a generally cylindrical shaft. The shaft is typically of length of approximately five feet. The shaft may have attached to it a yoke for manipulating the saw blade.

The device 60 is attached to the shaft of the powered rotary saw by disassembling the clamp 52. Brackets 66 and 68 are then placed around the shaft of the clearing saw at the end closest to the rotating saw blade. The support arm 102 is then installed in the bracket 68 and lock nut 106 is left in a loose condition. The rod 100 is then installed in the support arm 102. It will be noted, the rod 100 is preferably bent to include an offset portion so that rotating rod 100 about its general axis will change the amount of offset of the housing 58 relative to clamp 52. The applicator housing may then be positioned with the enclosure 86 substantially adjacent to the safety guard on the saw and with the lower surface of the sponge 88 located substantially at or slightly above the plane of the saw blade. With the sponge 88 located in that position then the set screw 104 and the lock nut 110 are tightened to fix the location of the various adjustable parts.

When using the device, the reservoir 54 is filled by introducing suitable herbicidal fluid through the fill opening 76. The reservoir 54 is then supported on the body of the user by means of the strap 78. The conduit 56 may advantageously be attached to the shaft of the saw by means of chord or plastic quick connect, disconnect ribbon type straps. The quick connect, disconnect fittings 82 and 96 are connected to one another to form a fluid path from the reservoir 54 directly to the sponge 88. The pump 80 may be used to transfer fluid from the reservoir through conduit 56, by check valve 92 and through conduit 90 directly to the sponge 88. Check valve 92 may be a spring loaded ball type check value with the spring biassing the valve to the closed position preventing fluid from draining from reservoir 54 through to sponge 88. Pressure from the pump overcomes the spring of check valve 92 to prevent fluid flow along the conduit 56.

Figure 4:
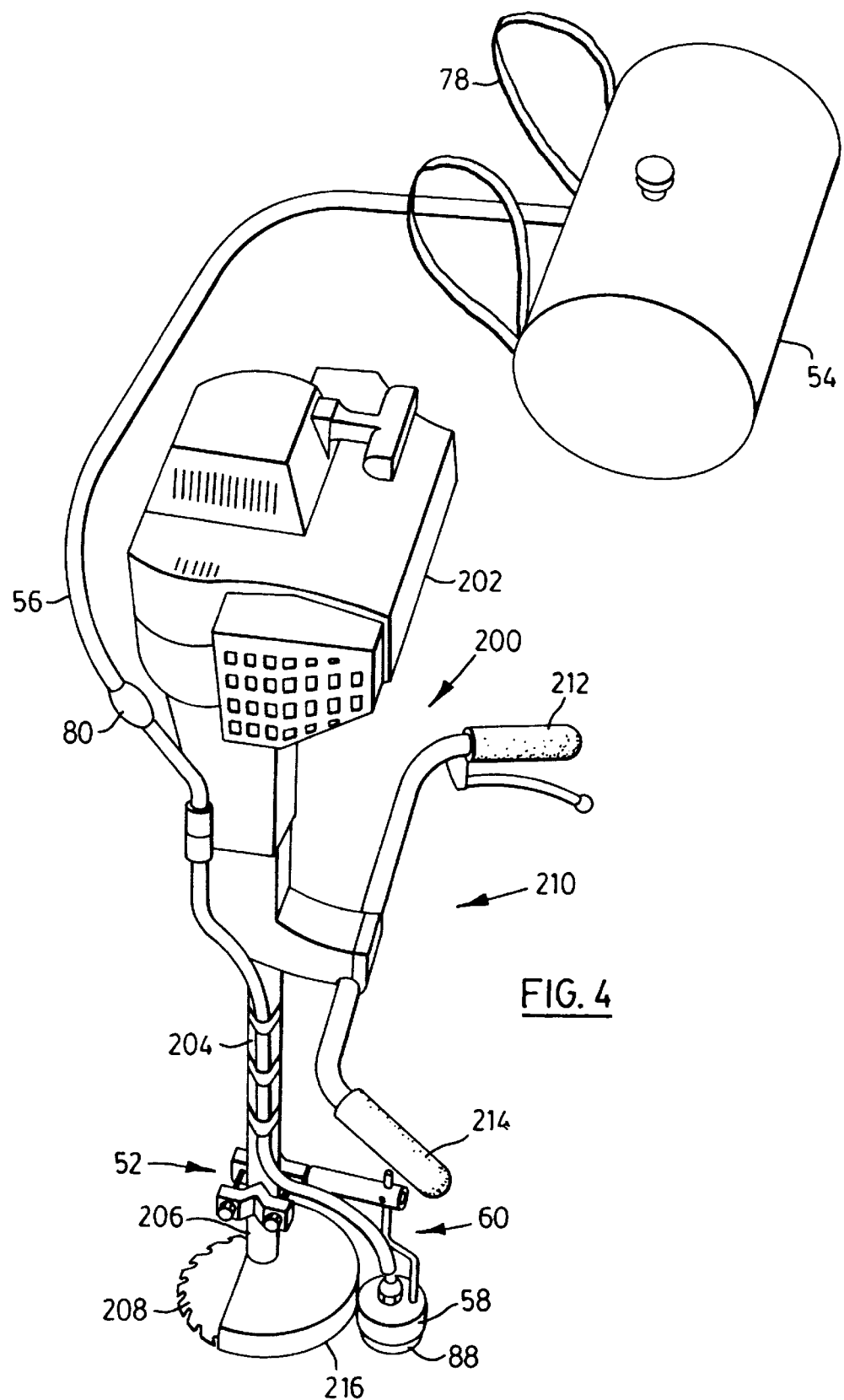
FIG. 4 shows the assembly kit of FIG. 3 installed on a tree cutting device.

FIG. 4 illustrates the device of FIG. 3 installed on a saw 200. The saw has a gasoline powered engine 202, and a shaft 204. The shaft 204 terminates in a fitting 206. The fitting supports a saw blade 208 for rotation. The motor 202 drives the blade 208 through a drive shaft which is journaled internally within the shaft 204. The saw has a handle indicated generally at 210 which includes grips 212 and 214. The grips 212 and 214 may include controls for operating the saw. The saw 200 includes a safety guard 216.

To use the combined device shown in FIG. 4, the operator typically starts the motor by use of a pull chord. The device is used by grasping the device with the hand grips 212 and 214 and controlling the clutch and speed of the motor to drive the saw blade 208. The device is steered by means of the hand grips 212 and 214 so that the saw blade 208 bears against the tree to be cut. The tree is cut by pressing the blade against the tree until the tree is cut through, leaving a stump. The device is then manoeuvred as necessary to bring the applicator housing 58 toward the freshly cut stump. If the sponge 88 is not already saturated with fluid then the operator releases one hand from one of the grips 212 or 214 and operates the pump 80, delivering fluid from the reservoir 54 to the sponge 88. The pressure from pump 80 unseats check valve 92 so that fluid may flow into the sponge 88 during the pumping action. When the sponge is suitably saturated, the sponge is then applied to the fresh cut surface. If the stump to be treated is smaller than the sponge, then the sponge is simply dabbed on top of the entire stump. If the stump is considerably larger than the sponge then the sponge is manoeuvred around the periphery of the stump so that the herbicide within the sponge is applied to all of the sap wood of the freshly cut tree. If a particularly large stump is being treated it may be necessary to pump additional fluid by means of hand pump 80 during the treating process. When the treating process has been completed, the operator then moves on to the next tree.

It will be observed that with the stump treating device of either FIG. 1 or the assembly as shown in FIG. 4, an operator can efficiently both cut and treat stumps. Because the fluid is applied by means of a fluid application device directly to the surface of the cut stump, there is efficient use and application of the herbicide. The herbicide is not brought into contact with anything other than the area touched by the sponge. This eliminates the effect of over spray and the treatment of stumps is independent of local wind conditions.

In disclosing this invention with these preferred embodiments, it has been suggested that the preferred method of applying the herbicidal fluid to the freshly cut stump is a sponge. Various other means of applying the fluid directly to the stump may also be utilized with the invention. By way of example, a bristle type device may also be used in which the fluid flows along the bristles. In addition, a pad-like device involving a plurality of holes on the backside to admit fluid to a pad and relying on the fluid to pass along and through the pad may also be utilized.

While the above description has been made in association with two preferred embodiments, it will be appreciated that the present invention is susceptible to modification and change without departing from the fair meaning of the proper scope of the accompanying claims.

What is claimed is:

1. A stump treating device comprising:
   a fluid reservoir,
   a fluid application device for applying fluid to said stump,
   a conduit for conveying fluid from said reservoir to said application device,
   a hand operated pump located in said conduit for delivering fluid through said conduit to said fluid application device,
   a valve for controlling fluid flow through said conduit,
   wherein said valve is located adjacent said fluid application device, and said valve is movable from
      a first position in which flow of fluid from said conduit to said fluid application device is blocked,
      to a second position in which flow of fluid from said conduit to said fluid application device is permitted, said valve including spring means biassing said valve to said first position, and wherein operation of said hand pump increases fluid pressure in said conduit and said increase in fluid pressure overcomes said biasing of said spring means to move said valve to said second position and permit flow of fluid from said conduit to said fluid application device.

2. The device of claim 1 wherein said fluid reservoir is a tank.

3. The stump treating device of claim 1 wherein said fluid application device includes a sponge.

4. The device of claim 3 wherein said device comprises a strap affixed to said tank for supporting said tank on an operator of said device.

5. The device of claim 3 wherein said conduit comprises first and second conduit means, said first conduit means having a free end and a first coupling means at said free end, said second conduit means having a free end and a second coupling means at said free end, said first and second coupling means having complementary configurations for joining said first and second conduit means together in fluid flow permitting leak free relation.

6. An assembly kit for creating a stump treating device, said kit comprising:

a fluid reservoir, a fluid application device,
  a conduit for conveying fluid from said reservoir to said application device, a valve for controlling flow of fluid through said conduit;

clamp means for attachment to a handle of a clearing saw;

housing means for containing said fluid application device;

support means for affixing said housing means to said clamp means;

said support means comprising adjustment means for adjustably positioning said fluid application means relative to said clamp means and wherein said housing means comprises a rod and said rod is adjustably received within said adjustment means.

7. The device of claim 6 wherein said adjustment means includes angular adjustment means for adjusting the relative angular relation between said clamp means and said rod.

8. The device of claim 7 wherein said angular adjustment means comprise a threaded boss, a threaded bore and a lock nut for locking the relative position of said rod relative to said clamp.

\* \* \* \* \*